United States Patent [19]

Ali Ja'afar et al.

[11] 4,119,238

[45] Oct. 10, 1978

[54] CONTAINER CLOSURE HAVING OPENING MEANS

[75] Inventors: Hamedo Ali Ja'afar, Rockford; Walter J. Iseman, Monroe Center, both of Ill.

[73] Assignee: Sundstrand Corporation, Rockford, Ill.

[21] Appl. No.: 813,222

[22] Filed: Jul. 5, 1977

[51] Int. Cl.² .............................................. B65D 55/00
[52] U.S. Cl. .................................... 220/211; 220/263
[58] Field of Search ............... 220/211, 260, 262, 334, 220/263, 264, 335; 49/21, 32

[56] References Cited

U.S. PATENT DOCUMENTS

| | | | |
|---|---|---|---|
| 2,834,504 | 5/1958 | Annico | 220/211 |
| 3,507,131 | 4/1970 | Stanway | 220/211 X |
| 3,540,618 | 11/1970 | Lildah | 220/211 |

Primary Examiner—George T. Hall
Attorney, Agent, or Firm—Wegner, Stellman, McCord, Wiles & Wood

[57] ABSTRACT

A closure for a container including a hinged lid movable between open and closed positions, operating means for moving the lid including a toggle linkage having bell crank means mounted for pivotal movement at a location beneath the open end of the container and a link pivotally connected to the upper side of the lid and one of the arms of the bell crank means whereby rotation of the bell crank means causes movement of the link and lid between open and closed positions, and the pivotal connections of the link and the pivotal mounting of the bell crank means lying in a straight line extending lengthwise of the container when the lid is closed whereby the lid is prevented from opening other than by rotation of the bell crank means.

9 Claims, 3 Drawing Figures

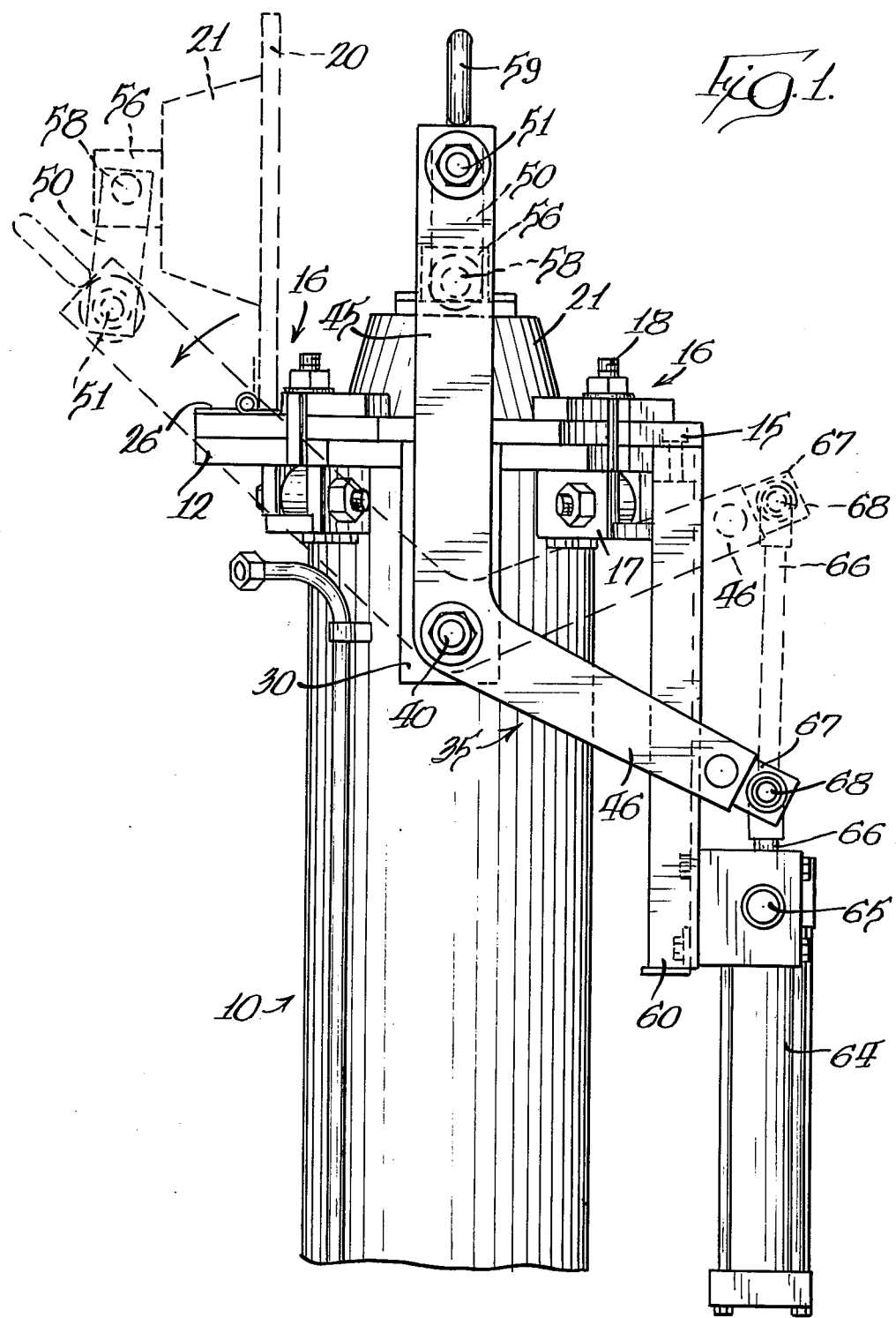

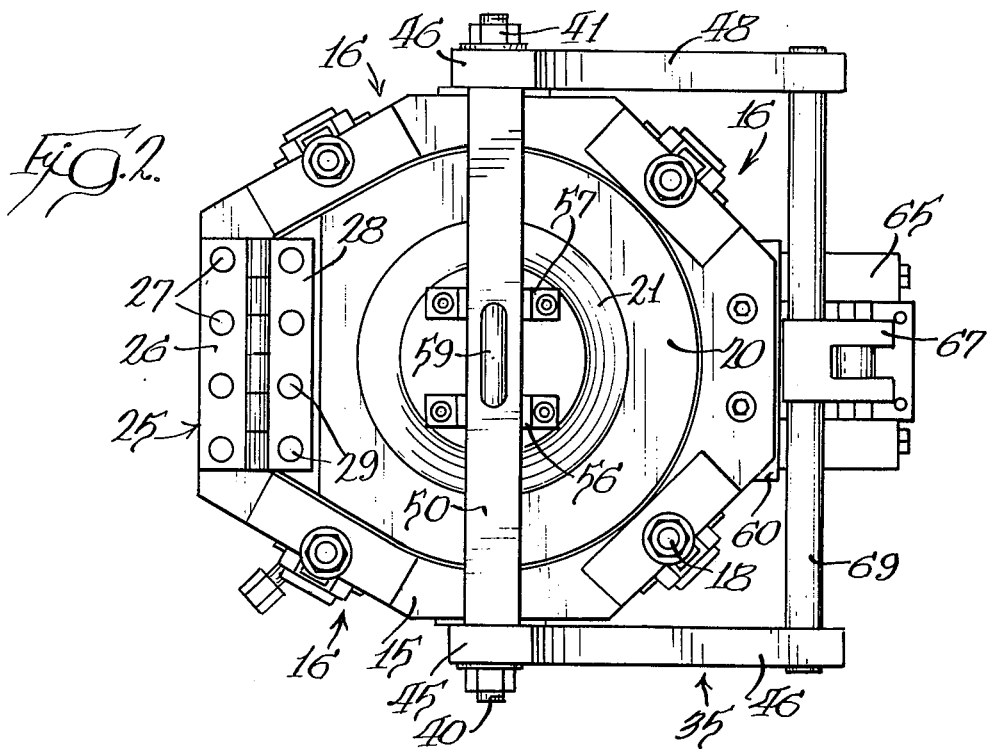
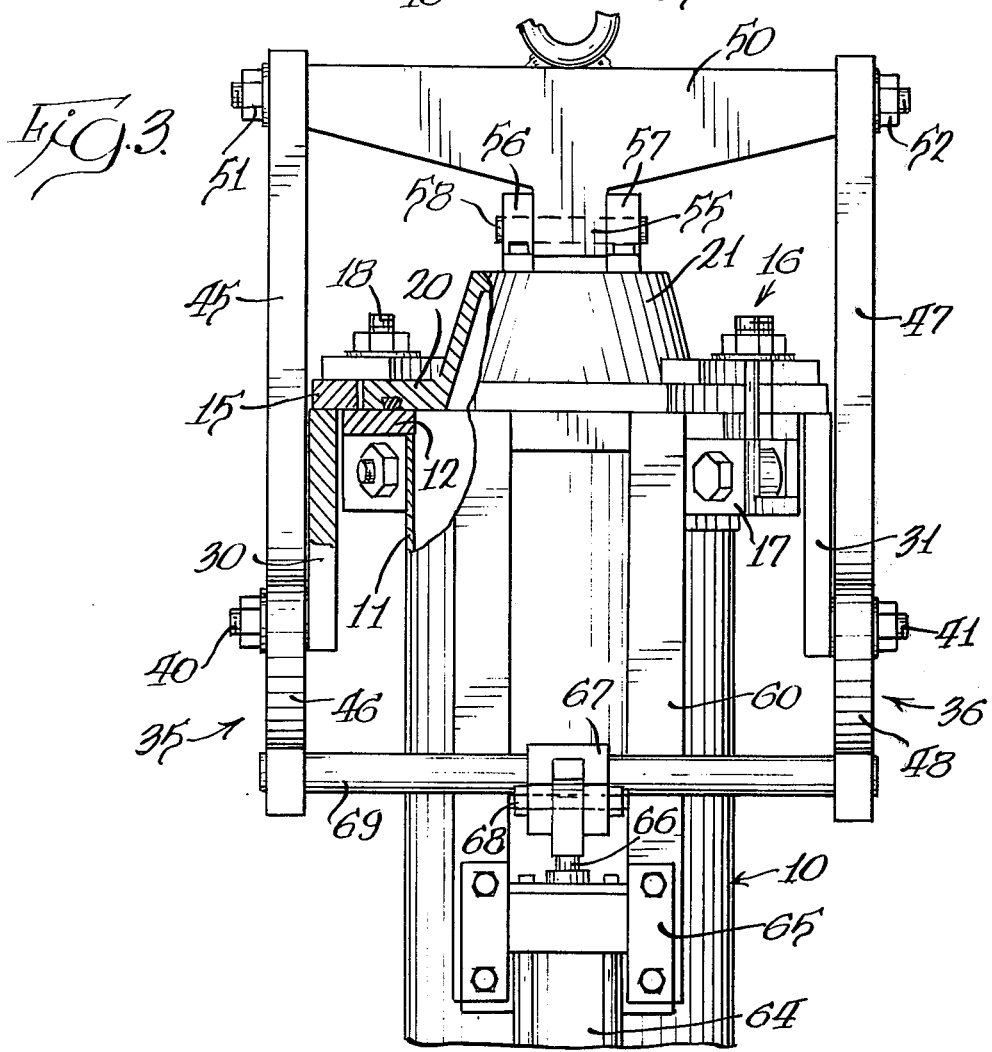

CONTAINER CLOSURE HAVING OPENING MEANS

BACKGROUND OF THE INVENTION

In connection with nuclear energy it is necessary to remotely detect defective fuel elements in fuel assemblies. This detection can be done by either water or gas analysis. In such a detection system a sipping can or container is used and this can should have a closure which is remotely operable and which will remain closed regardless of the condition of power means for opening and closing the lid. In view of the foregoing, this invention pertains to a closure for a container which may be remotely actuation operable by actuation of power means at the container and with the structure for moving the lid being positioned, when the lid is closed, to prevent opening of the lid regardless of the condition of the power means.

The prior art includes Jones U.S. Pat. No. 3,762,993 relating to an apparatus for detecting reactor fuel tube failures. Additional prior art relating to closure includes Annicq U.S. Pat. No. 2,834,504 with a fluid cylinder operating a linkage for positioning of a lock member for holding a pressure vessel lid in locked position. Additionally, Lildal U.S. Pat. No. 3,540,618 shows a lid for a vessel operable between open and closed position by a linkage structure.

None of the above cited prior art discloses a remotely operable container closure wherein a lid can be moved between open and closed positions by a linkage structure which is positioned when the lid is closed to inherently hold the lid against opening movement except through actuation of the linkage structure.

SUMMARY

A primary feature of the invention disclosed herein is to provide a container closure lid which is maintained in a closed position by the structural relation of the linkage means which are connectecd to the lid and movable for opening and closing of the lid.

In carrying out the foregoing a primary object of the invention is to provide a closure for a container having a lid movable relative to an open end of a container between open and closed positions, toggle linkage means supported by the container for movement relative thereto and including a link pivotally connected to the lid, and remotely operable power means supported by the container and having a movable element connected to said toggle linkage means for moving the toggle linkage and lid between open and closed positions and with said link positionable to hold the lid closed independently of said power means.

Another object of the invention is to provide a container closure including a lid, bell crank means pivotally mounted relative to the container at a level below the open end thereof with one arm thereof extending lengthwise of the container and having an end positioned above the lid when the lid is closed, and a link connected between the lid and said end of said bell crank arm and extending parallel to said one arm and along a straight line including the pivot mount of the bell crank means when the lid is closed.

Still another object of the invention is to provide a container closure as defined in the preceeding paragraph wherein the bell crank means and the link define a toggle linkage with power means connected to another arm of the bell crank means for causing pivoting thereof for resulting movement of the link and following movement of the lid between open and closed positions. The link and the first-mentioned bell crank arm extend lengthwise of the container along said straight line when the lid is closed whereby any lifting force imparted directly to the lid acts along said straight line and said link and bell crank means are so aligned as to not rotate and thus function to prevent opening movement of the lid.

BRIEF DESCRIPTION OF THE DRAWINGS

FIG. 1 is a fragmentary side elevational view of the container enclosure therefore with the lid and operating linkage shown in a broken line open position;

FIG. 2 is a plan view of the structure shown in FIG. 1 with the lid closed; and

FIG. 3 is a fragmentary side elevational view of the structure shown in FIG. 1 looking toward the right hand side thereof.

DESCRIPTION OF THE PREFERRED EMBODIMENT

A container indicated generally at 10 has a generally cylindrical wall 11 with an open upper end having an outwardly extending annular flange 12.

An adapter plate 15 rests on the annular flange 12 and is fastened thereto by a series of locking devices, indicated generally at 16, which each include a locking block 17 positioned beneath the annular flange 12 and which are rotated into locked position beneath the annular flange and tightened by a clamping bolt 18.

The adapter plate 15 has a central opening overlying the open end of the container 10 and carries a lid 20 for closing said opening with the lid 20 having a centrally disposed dome section 21. The lid 20 is mounted to the adapter plate 15 for pivoting movement by hinge means indicated generally at 25 which are connected along one edge of the adapter plate and along an adjacent edge of the lid 20. The connection of a hinge leaf 26 to the adapter plate is by fastening means 27 and the other hinge leaf 28 is connected to the lid by fastening means 29.

At opposite sides of the adapter plate 15 there are depending arms 30 and 31 integral therewith which extend downwardly along the container to provide pivotal connections for bell crank means including a pair of bell cranks, indicated generally at 35 and 36. The bell crank 35 is pivoted to the arm 30 by pivot means 40 and the bell crank 36 is pivoted to the depending arm 31 by pivot means 41. The bell crank 35 has a first arm 45 and a second arm 46 at opposite sides of the pivot means 40 and the bell crank 36 has a first arm 47 and a second arm 48 at opposite sides of the pivot means 41. The first arms 45 and 47 extend upwardly to a level above the open end of the container and at their upper ends carry a link 50 which is elongate to extend adjacent to the upper ends of the bell crank arms 45 and 47 and be pivotally connected thereto by respective pivot means 51 and 52. The link 50 has a depending central part 55 which fits between a pair of spaced-apart ears 56 and 57 fixed to the upper side of the domed part 21 of the lid 20 and with a pivot shaft 58 extending through the ears 56 and 57 and the depending part 55 of the link to pivotally connect the link to the lid 20. A transport hook 59 is positioned on top of the link 50.

A bracket 60 depends from a side of the adapter plate 15 intermediate the sides mounting the depending arms 30 and 31 and has power means pivotally connected thereto. The power means includes a fluid cylinder 64 mounted to the bracket 60 by a pivot mount 65 and having a piston rod 66 movable between the retracted position shown in full line in FIG. 1 and an extended position shown in broken line. The piston rod 66 is connected to a bracket 67 by means of a connector 68 and the bracket 67 is secured to a rod 69 extending between the ends of the bell crank arms 46 and 48, as shown particularly in FIGS. 2 and 3.

With the piston rod 66 retracted the lid 20 is closed as shown in full line in FIG. 1. With the piston rod 66 extended to the broken line position line shown in FIG. 1 the bell cranks 35 and 36 are caused to rotate to the broken line position with a pull on the link 50 and with resulting raising movement of the lid 20 to the broken line position. This movement is to a position which is limited to not have the link 50 go beyond the vertical to assure that return movement of the linkage can occur with retraction of the piston rod 66.

In the closed position as shown in the drawings, the pivotal mounting of the bell cranks 35 and 36 is in a straight line with the pivotal connections of the link 50 to the bell crank arms 45 and 47 and to the lid 20 with the link 50 extending parallel to the arms 45 and 47 of the bell cranks. This results in a toggle type linkage whereby any force applied directly to the lid 20 in a direction tending to open the lid is an upward force and there cannot be any raising of the lid since the link 50 and the bell crank arms 45 and 47 and their pivot connections are in a straight line so that no rotative force is applied to the linkages and the lid remains closed.

With this structure the lid may be moved between open and closed positions by remote control through supply of fluid such as pressure air to the cylinder 65. With the lid in closed position, it is not necessary to continue supply of pressure air to the cylinder 65 in order to maintain the lid closed. Additionally, the self-sustaining structure for lid closure makes it unnecessary to design the power means of a capacity to hold the lid closed and the power means need only have a capacity sufficient to rotate the toggle linkage and the lid 20.

We claim:

1. A closure for a container comprising, a lid movable relative to an open end of the container between open and closed positions, toggle linkage means supported by the container for movement relative thereto and including a link pivotally connected to said lid, and power means supported by said container and having a movable element connected to said toggle linkage means for moving said toggle linkage means and the lid between open and closed positions and with said linkage positionable to hold the lid closed independently of said power means.

2. A closure as defined in claim 1 wherein said lid is hinged relative to the container and said power means comprises a fluid cylinder.

3. A closure as defined in claim 1 wherein said toggle linkage includes bell crank means pivotally carried by the container with one arm thereof connected to the movable element of the power means and the other arm thereof pivotally connected to said link.

4. A closure as defined in claim 3 wherein said link and the other arm of the bell crank means are in parallel relation when the lid is closed.

5. A closure as defined in claim 3 wherein the bell crank means pivots about an axis below the open end of the container and the pivotal connections of said link are above said lid and are along a generally straight line including said axis when the lid is closed whereby said toggle linkage resists any force acting on the lid in an opening direction.

6. A closure as defined in claim 5 wherein an adapter plate is attached to the container at the open end thereof, hinge means connecting said lid to the adapter plate, and means depending from the adapter plate for pivotally mounting the bell crank means.

7. A container closure including a lid which remains closed against any opening force applied directly to the lid, bell crank means pivotally mounted relative to the container at a level below an open end thereof with one arm thereof extending lengthwise of the container and having an end positioned above the lid when the lid is closed, and a link connected between the lid and said end of said bell crank arm and extending parallel to said one arm and along a straight line including the pivot mount of the bell crank means when the lid is closed.

8. A power operable container closure comprising, a hinged lid for closing an open end of the container, bell crank means including a pair of bell cranks positioned one at each of opposite sides of the container, means pivotally mounting said bell cranks at a location beneath the open end of the container, first arms of said bell cranks extending upwardly with ends therof overlying said lid when the lid is closed, a link pivotally connected at one end to said ends of the bell crank arms and at the other end thereof to said lid, said pivotal connections of the link and pivotal mounting of the bell cranks lying along a straight line extending lengthwise of the container when the lid is closed, and a power operator operatively connected to the other arms of the bell cranks for pivoting the bell cranks to move said link and lid to and from said closed position.

9. A power operable container closure which remains closed independently of the power operator comprising, an adapter plate fastenable to a container adjacent an open end thereof, a lid hinged to said adapter plate for closing an opening in said adapter plate, bell crank means including a pair of bell cranks positioned one at each of opposite sides of the adapter plate, means on the adapter plate for pivotally mounting said bell cranks at a location beneath the open end of the container, first arms of said bell cranks extending upwardly with ends thereof overlying said lid when the lid is closed, a link pivotally connected at one end to said ends of the bell crank arms and at the other end thereof to said lid, said pivotal connections of the link and pivotal mounting of the bell cranks lying along a straight line extending lengthwise of the container when the lid is closed, and a power operator including fluid cylinder means having a rod operatively connected to the other arms of the bell cranks for pivoting the bell cranks to move said link and lid to and from said closed position with pivoting of the bell cranks from the lid closed position pulling said link to raise said lid.

* * * * *